July 11, 1950     D. E. FARMER     2,514,482
RESONANCE INSPECTION DEVICE

Filed April 17, 1948     2 Sheets-Sheet 1

INVENTOR.
DANIEL E. FARMER
BY
Joseph H. Lipschutz
ATTORNEY

July 11, 1950     D. E. FARMER     2,514,482
RESONANCE INSPECTION DEVICE

Filed April 17, 1948     2 Sheets-Sheet 2

INVENTOR.
DANIEL E. FARMER
BY
Joseph H. Lipschutz
ATTORNEY

Patented July 11, 1950

2,514,482

UNITED STATES PATENT OFFICE 2,514,482

RESONANCE INSPECTION DEVICE

Daniel E. Farmer, New York, N. Y., assignor to Sperry Products, Inc., Hoboken, N. J., a corporation of New York Application April 17, 1948, Serial No. 21,645

3 Claims. (Cl. 73—67)

This invention relates to the type of inspection device employed principally for measuring the thickness of objects by transmitting into the object a range of supersonic frequencies, on the principle that at a given frequency, i. e., where the thickness equals one half a wave length, resonance will be established corresponding to the measured depth. The vibrations are transmitted into the object under test, and the reflections of the vibrations within the object are received, by a piezo-electric element such as a crystal whose output is greatly increased when resonance is established.

The indicator which is usually employed with such inspection method comprises an oscilloscope having a sweep of predetermined duration, during which time interval a range of frequencies is applied to the crystal. The range of frequencies corresponds to a range of thicknesses or depths below the transmitting surface of the object. The output of the crystal is applied to the vertical plates of the oscilloscope, and when resonance is established, a sharply increased vertical deflection of the horizonal sweep will occur.

The range of frequencies during the time interval of the cathode ray tube sweep is obtained by means such as a motor driven condenser. The wave lengths thus obtained when calibrated with respect to time are usually not a linear function. If the sweep voltage when plotted against time is of a different graphic form from that of the range of wave lengths generated by the variable condenser, it will be apparent that for equal increments of time there will be increments in wave length which are not proportional to the increments in sweep voltage. Thus, it is necessary to calibrate an oscilloscope screen for each wave length generator, usually by a Celluloid strip adapted to overlay the cathode ray tube screen. In addition, each time there is a change in sweep wave form or in the wave length generator, a different calibration is required.

It is, therefore, the principal object of this invention to provide a method and means for generating a sweep voltage which is at all times directly proportional to the generated wave length, whereby regardless of the variation of frequency (wave length) with respect to time, a given point on the oscilloscope screen will always correspond to a given measured thickness.

Further objects and advantages of this invention will become apparent in the following detailed description thereof.

In the accompanying drawings.

Figure 3A:
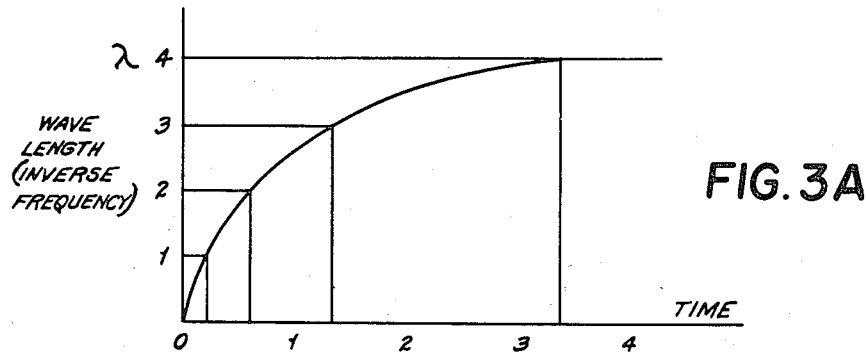

Figs. 3A, B, and C are graphs illustrating the theory underlying this invention.

Figure 1:
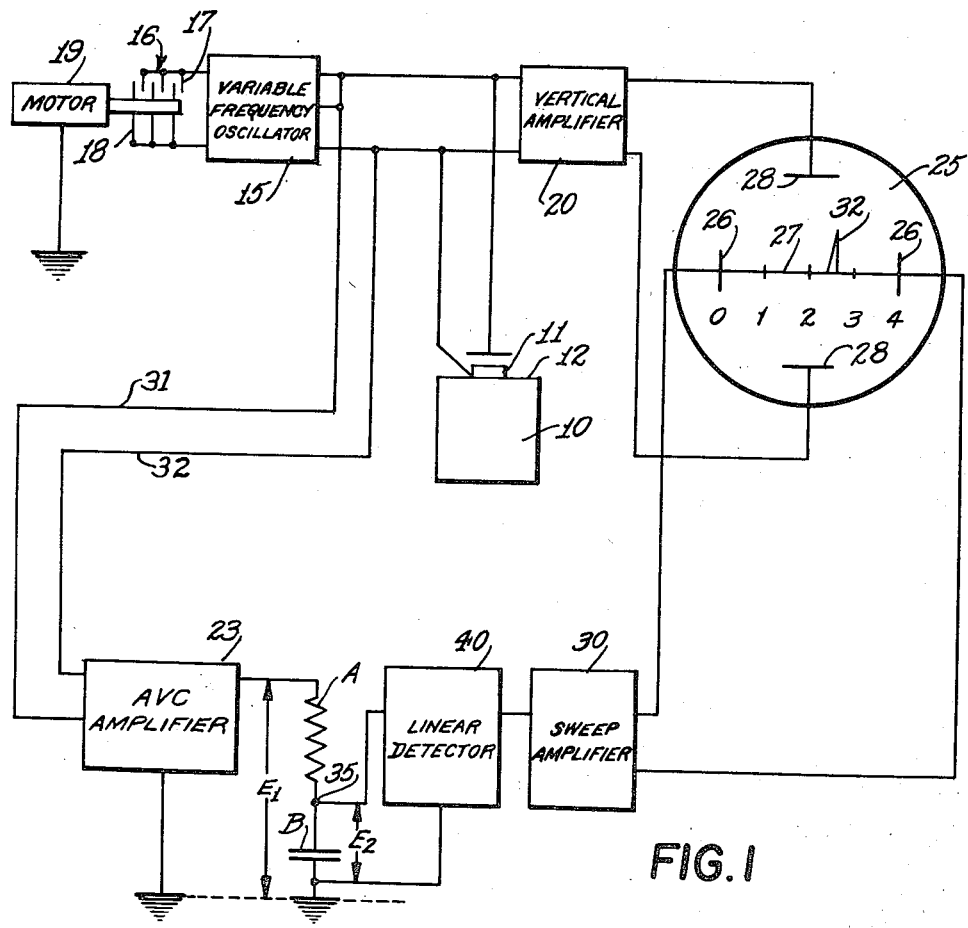
Fig. 1 is a wiring diagram illustrating one embodiment of this invention.
Figure 2:
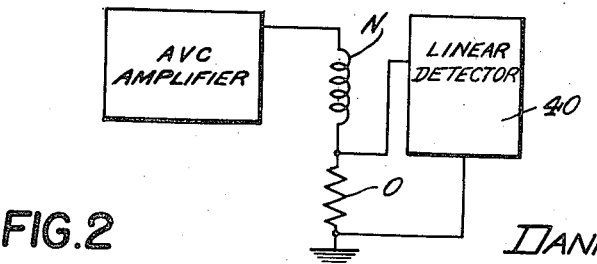
Fig. 2 is a view similar to a portion of the Fig. 1 arrangement but showing a modified form.

Referring to Fig. 1 of the drawing there is disclosed a workpiece 10 which is to be inspected either for measuring its thickness or for measuring the depth below one of its surfaces of a flaw or other internal reflecting surface. For this purpose a piezo-electric crystal 11 is applied to one surface 12 of the workpiece and a range of mechanical vibrations is transmitted into the workpiece by means of a range of electrical oscillations applied to the crystal 11 by an oscillator 15 having a variable reactance member which may be a variable capacitor 16. In order to achieve an output of frequencies from oscillator 15 through a predetermined range, the variable capacitor may consist of fixed plates 17 and rotatable plates 18 adapted to be rotated by a motor 19. Thus, each time the motor makes a revolution, the capacitance of the capacitor will be varied through a predetermined range to yield a variation in frequency output from oscillator 15 through a predetermined range of frequencies, and hence of wave lengths. This range is so chosen that resonance will be established in the workpiece somewhere within the range.

When resonance is established within the workpiece, the wave length is twice the thickness of the workpiece and the vibration output received by crystal 11 will be at a maximum. Therefore, the voltage output will be at a maximum and this voltage output, after being amplified by amplifier 20, may be caused to indicate upon a suitable indicator such as oscilloscope 25 having horizontal plates 26 between which a sweep 27 is established by means of a sweep circuit including the output of sweep amplifier 30, the oscilloscope having a set of vertical plates 28 on which the output of amplifier 20 is placed to deflect the sweep vertically in response to output from crystal 11. Thus, when resonance is established, a mark such as 32 will appear.

As stated in the introduction hereto, if the rate of voltage increase per unit of time applied to plates 26 is not proportional to the rate of frequency or wave length change per unit of time, it would be necessary to calibrate the oscilloscope screen because equal increments in the sweep would not represent equal increments in the wave length variation. Thus, by referring to Fig. 3C, it will be seen that if equal increments of voltage are applied to the horizontal plates in equal increments of time, a straight line graph will be obtained. However, by referring to Fig. 3A, if the variation in wave length λ is not constant per unit of time, there results a graph that is different from the straight line graph. Thus, equal increments of time yield unequal increments in wave length variation, and hence necessitates calibration on the oscilloscope screen. I, therefore, provide the following means which perform two functions: (1) the sweep is derived from the generation of the range of wave lengths by the oscillator 15, and (2) the sweep voltage is made proportional to the generated wave length. In this manner a given point on the sweep would always indicate a given wave length, and therefore a given thickness of object.

To accomplish the above purposes I provide means whereby the frequency variation generated by oscillator 15 is converted into a voltage variation for generating the sweep. To this end there is shunted from the output of oscillator 15 by leads 31 and 32, a portion of the voltage which is then passed through an amplifier 23 of the automatic volume control type which will give a constant voltage output but varying in frequency corresponding to the variations in frequency generated by oscillator 15. This voltage is indicated as $E_1$.

To transform the varying frequencies of constant voltage $E_1$ into varying voltages $E_2$, there is provided in the output of amplifier 33 a network consisting of two impedances, in this case, a resistance A and a capacitor B, connected in series, with a tap 35 taking off the voltage across the capacitor B which is grounded. It will now be shown how the voltage $E_1$ of varying frequency applied to the network A, B, will yield a varying voltage $E_2$ across the capacitor B. The following notations are used:

$E_1$—A. C. voltage, varying cyclically in frequency, of constant magnitude, and instantaneous frequency $f$, or instantaneous wave length λ.
A—Resistor of R ohms resistance.
B—Capacitator of $C_B$ farads capacitance.
Z—Impedance in ohms across the combined elements A and B.
$X_B$—Reactance in ohms of capacitor B.
$E_2$—Magnitude of A. C. voltage appearing across capacitor B.
V—Velocity of propagation of electric wave.

The following relationship exists:

$$E_2 = \frac{X_B}{Z} \times E_1$$

$$= \frac{X_B}{\sqrt{R^2 + X_B^2}} \times E_1$$

R is made very much larger than $X_B$. Therefore, $$E_2 = \frac{X_B}{R} \times E_1$$

but $$X_B = \frac{1}{2\pi f C_B}$$

Therefore $$E_2 = \frac{\lambda}{2\pi C_B R V} \times E_1$$

Since $$\frac{E_1}{2\pi C_B R V}$$

is a constant referred to hereinafter as $K_1$, therefore, $$E_2 = K_1 \lambda$$

from which it can be seen that the magnitude of $E_2$ is proportional to the wave length λ of $E_1$.

Figure 3B:
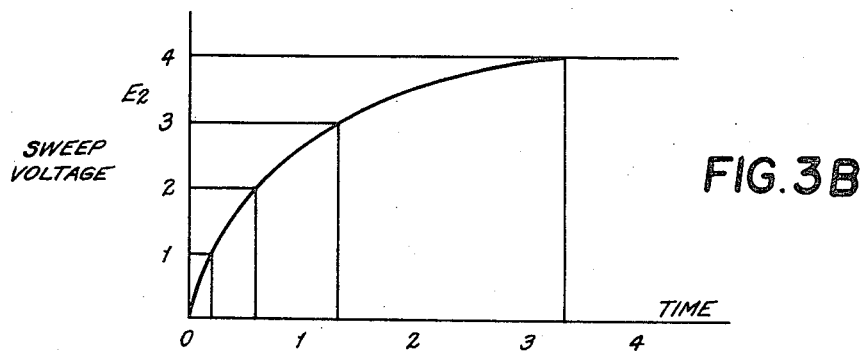
Figure 3C:
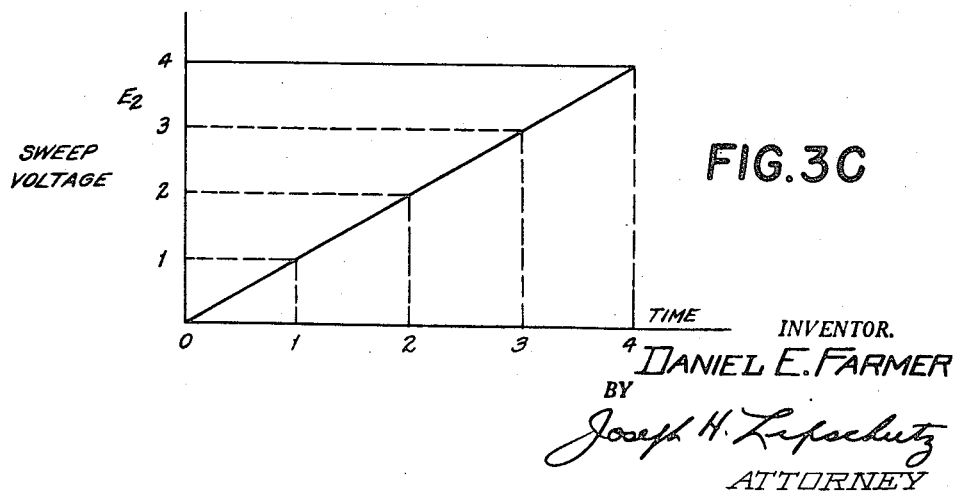

Thus, by the method and means described above, the variable wave length generated by oscillator 15 has been transformed into a variable voltage proportional to this wave length, and hence, if the variable voltage $E_2$ is utilized for the generation of the sweep, it will be seen that the sweep voltage per unit of time will be proportional to the wave length variation per unit of time. Thus, by referring to Figs. 3A and 3B it will be seen that the graph of wave length plotted against time is of the same shape as the graph of sweep voltage plotted against time, and hence $E_2$ is proportional to λ, from which it follows that a given point on the oscilloscope screen will always correspond to a given thickness, i. e., one half λ. Thus, by referring to Figs. 3A and 3B it will be seen that if the sweep voltage $E_2$ is always directly proportional to the variations in wave length λ, the change in sweep voltage per unit of time will be proportional to the changes in wave length per unit of time, and hence similar graphs will be obtained when λ and $E_2$ are plotted against equal units of time, as shown in Figs. 3A and 3B.

The voltage $E_2$ may be applied to a linear detector 40 to obtain the envelope of variations and the output of the detector may be amplified by amplifier 30 before being applied to the plates 26.

In a modified form of the invention, the elements A and B which are a resistor and a capacitor, respectively, may be replaced by an inductance N and a resistor O respectively. It can be demonstrated that the same result will be obtained as in the Fig. 1 form. Assume:

N is an inductor of reactance $X_N$ ohms and inductance of $L_N$ henries
O is a resistor of R ohms resistance
Then $$E_2 = \frac{R}{\sqrt{R^2 + X_N^2}} \times E_1$$

$X_N$ is made very much larger than R. Therefore, $$E_2 = \frac{R}{X_N} \times E_1$$

$$X_N = 2\pi f L_N$$

$$X_N = \frac{2\pi L_N V}{\lambda}$$

$$E_2 = \frac{R E_1}{2\pi L_N V} \times \lambda$$

$\frac{R E_1}{2\pi L_N V}$ = a constant referred to hereinafter as $K_2$

Therefore, $E_2 = K_2 \lambda$.

Having described my invention, what I claim and desire to secure by Letters Patent is:

1. In a resonance inspection device for inspecting an object, said device comprising means for periodically generating a range of oscillations, transducer means for applying said oscillations to the object and for receiving oscillations from the object, an oscilloscope having vertical and horizontal sets of plates, means for generating a sweep between one set of plates, and means for applying the transducer voltages to the second set of plates, characterized by the improvement which consists of means for obtaining a constant relationship between the sweep and the generated oscillations, said last named means comprising means for transforming the wave length variations of the generated oscillations into voltages, and means for applying said last named voltages to the first set of plates.

2. In a resonance inspection device for inspecting an object, said device comprising means for periodically generating a range of oscillations, transducer means for applying said oscillations to the object and for receiving oscillations from the object, an oscilloscope having vertical and horizontal sets of plates, means for generating a sweep between one set of plates, and means for applying the transducer voltages to the second set of plates, characterized by the improvement which consists of means for obtaining a constant relationship between the sweep and the generated oscillations, said last named means comprising means for transforming the wave length variations of the generated oscillations into voltages having a linear relation to the wave length variations, and means for applying said last named voltages to the first set of plates.

3. In a resonance inspection device for inspecting an object, said device comprising means for periodically generating a range of oscillations, transducer means for applying said oscillations to the object and for receiving oscillations from the object, an oscilloscope having vertical and horizontal sets of plates, means for generating a sweep between one set of plates, and means for applying the transducer voltages to the second set of plates, characterized by the improvement which consists of means for obtaining a constant relationship between the sweep and the generated oscillations, said last named means comprising means for limiting the generated oscillations to voltages of constant amplitude, means for transforming the wave length variations of the constant amplitude oscillations into voltages having a linear relation to the wave length variations, and means for applying said last named voltages to the first set of plates.

DANIEL E. FARMER.

REFERENCES CITED

The following references are of record in the file of this patent:

UNITED STATES PATENTS

| Number | Name | Date |
|---|---|---|
| 2,303,214 | Labin et al. | Nov. 24, 1942 |
| 2,431,234 | Rassweiler et al. | Nov. 18, 1947 |